US012246741B2

United States Patent
Kashu et al.

(10) Patent No.: US 12,246,741 B2
(45) Date of Patent: *Mar. 11, 2025

(54) VEHICLE CONTROLLER, AND METHOD AND COMPUTER PROGRAM FOR DISTANCE NOTIFICATION

(71) Applicant: TOYOTA JIDOSHA KABUSHIKI KAISHA, Toyota (JP)

(72) Inventors: Takao Kashu, Tokyo-to (JP); Yasutaka Teramae, Kawasaki (JP); Hiroki Ukai, Kariya (JP); Masahiro Goto, Kariya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/668,343

(22) Filed: May 20, 2024

(65) Prior Publication Data
US 2024/0300514 A1    Sep. 12, 2024

Related U.S. Application Data

(63) Continuation of application No. 17/657,018, filed on Mar. 29, 2022, now Pat. No. 12,017,672.

(30) Foreign Application Priority Data

Mar. 30, 2021   (JP) .................. 2021-057608

(51) Int. Cl.
*B60W 50/14* (2020.01)
*B60W 60/00* (2020.01)
(Continued)

(52) U.S. Cl.
CPC .......... *B60W 50/14* (2013.01); *B60W 60/005* (2020.02); *G01C 21/3446* (2013.01);
(Continued)

(58) Field of Classification Search
CPC .............. B60W 50/14; B60W 60/005; B60W 2050/143; B60W 2050/146;
(Continued)

(56) References Cited

U.S. PATENT DOCUMENTS

2016/0167652 A1   6/2016   Slusar
2016/0231743 A1   8/2016   Bendewald et al.

FOREIGN PATENT DOCUMENTS

JP   2015017944 A   1/2015
JP   2017036989 A   2/2017
(Continued)

OTHER PUBLICATIONS

Takao Kashu et al., U.S. Appl. No. 17/657,018, filed Mar. 29, 2022.
(Continued)

*Primary Examiner* — Nabil H Syed
*Assistant Examiner* — Cal J Eustaquio
(74) *Attorney, Agent, or Firm* — Dickinson Wright, PLLC

(57) ABSTRACT

A vehicle controller includes a memory configured to store map information including information on a predetermined area used in autonomous driving control of a vehicle; and a processor configured to: refer to the map information to identify an autonomous-driving practicable point at which a planned travel route from the current position of the vehicle outside the predetermined area to a destination of the vehicle enters the predetermined area, calculate a manual-driving section length from the current position of the vehicle to the autonomous-driving practicable point along the planned travel route, and notify the calculated manual-driving section length to a driver of the vehicle via a notification device provided in the interior of the vehicle.

6 Claims, 5 Drawing Sheets

(51) Int. Cl.
　　　*G01C 21/34*　　　(2006.01)
　　　*G01C 21/36*　　　(2006.01)
(52) U.S. Cl.
　　　CPC ....... *G01C 21/3461* (2013.01); *G01C 21/367* (2013.01); *G01C 21/3697* (2013.01); *B60W 2050/143* (2013.01); *B60W 2050/146* (2013.01); *B60W 2556/40* (2020.02)
(58) Field of Classification Search
　　　CPC ......... B60W 2556/40; B60W 2556/50; B60W 60/0053; B60W 60/0051; B60W 60/0057; G01C 21/3446; G01C 21/3461; G01C 21/367; G01C 21/3697
　　　See application file for complete search history.

(56)　　　　　　References Cited

FOREIGN PATENT DOCUMENTS

| | | |
|---|---|---|
| JP | 2018044834 A | 3/2018 |
| JP | 2018077086 A | 5/2018 |

OTHER PUBLICATIONS

Takao Kashu et al., U.S. Appl. No. 17/657,018, Non-Final Office Action dated Jun. 7, 2023.
Takao Kashu et al., U.S. Appl. No. 17/657,018, Final Office Action dated Aug. 29, 2023.
Takao Kashu et al., U.S. Appl. No. 17/657,018, Notice of Allowance dated Mar. 8, 2024.

VEHICLE CONTROLLER, AND METHOD AND COMPUTER PROGRAM FOR DISTANCE NOTIFICATION

RELATED APPLICATIONS

This application is a continuation of U.S. patent application Ser. No. 17/657,018, filed Mar. 29, 2022, which claims priority to Japanese Patent Application No. 2021-057608, filed on Mar. 30, 2021, including the specification, drawings and abstract, the entire disclosure of which is incorporated herein by reference.

FIELD

The present invention relates to a vehicle controller capable of autonomous driving control of a vehicle and to a method and a computer program for notification of the distance to a predetermined location.

BACKGROUND

Techniques for autonomous driving control of a vehicle have been researched, and infrastructure therefor has been built. Thus, a planned travel route for a vehicle to go to a destination may include a section where autonomous driving control is applicable and a section where it is inapplicable. To increase a driver's convenience in such a case, techniques for notifying the driver of information on sections where autonomous driving control is applicable have been proposed (see, U.S. Patent Application Publication No. 2016/0231743 and Japanese Unexamined Patent Publication No. 2018-77086).

A driver assistance system disclosed in U.S. Patent Application Publication No. 2016/0231743 determines the start point of a section where it can automatically control a vehicle in a route planned for the vehicle predefined by a navigation system. The driver assistance system determines the distance between the current position of the vehicle and the start point, and outputs the distance to a driver in the vehicle.

An information display disclosed in Japanese Unexamined Patent Publication No. 2018-77086 searches for a route to a destination, and determines which each section included in the route is a section where autonomous driving is practicable or a section where it is impracticable. The information display includes information indicating a boundary location between a section where autonomous driving is practicable and a section where it is impracticable in a point guidance image in which pieces of information related to event locations are arranged in order from a current position to the destination, and displays the image.

SUMMARY

To increase a driver's convenience, it is desirable to notify the driver of the accurate distance to a location to enter a section where autonomous driving control is applicable.

It is an object of the present invention to provide a vehicle controller that can notify a driver of the distance to a location at which his/her vehicle enters an area where autonomous driving control is applicable.

According to an embodiment, a vehicle controller capable of autonomous driving control of a vehicle is provided. The vehicle controller includes a memory configured to store map information including information on a predetermined area used in autonomous driving control of the vehicle; and a processor configured to: refer to the map information to identify an autonomous-driving practicable point at which a planned travel route from the current position of the vehicle outside the predetermined area to a destination of the vehicle enters the predetermined area, calculate a manual-driving section length from the current position of the vehicle to the autonomous-driving practicable point along the planned travel route, and notify the calculated manual-driving section length to a driver of the vehicle via a notification device provided in the interior of the vehicle.

The memory of the vehicle controller preferably further stores route-search-purpose map information for route search. The processor is preferably further configured to: refer to the map information to detect at least one candidate for an alternative entry point to enter the predetermined area within the manual-driving section length of the current position of the vehicle, for each of the at least one candidate, refer to the route-search-purpose map information to search for a route from the current position of the vehicle to the candidate, calculate the distance from the current position of the vehicle to the candidate along the route, select one of the at least one candidate whose distance from the current position of the vehicle is shorter than the manual-driving section length as an alternative entry point, and notify the driver of the alternative entry point and the distance from the current position of the vehicle to the alternative entry point via the notification device.

Alternatively, the memory of the vehicle controller preferably further stores route-search-purpose map information for route search. The processor is preferably further configured to: in the case that the planned travel route does not pass through the predetermined area, refer to the map information to detect at least one candidate for an entry point to enter the predetermined area within a predetermined distance of the current position of the vehicle, for each of the at least one candidate, refer to the route-search-purpose map information to search for a route from the current position of the vehicle to the candidate, calculate the distance from the current position of the vehicle to the candidate along the route, select one of the at least one candidate as an entry point, and notify the driver of the entry point and the distance from the current position of the vehicle to the entry point via the notification device.

Alternatively, the memory of the vehicle controller preferably further stores route-search-purpose map information for route search. The processor is preferably further configured to: in the case that the planned travel route is not set, refer to the map information to detect at least one candidate for an entry point to enter the predetermined area within a predetermined distance of the current position of the vehicle, for each of the at least one candidate, refer to the route-search-purpose map information to search for a route from the current position of the vehicle to the candidate, calculate the distance from the current position of the vehicle to the candidate along the route, select one of the at least one candidate as an entry point, and notify the driver of the entry point and the distance from the current position of the vehicle to the entry point via the notification device.

According to another embodiment, a method for distance notification is provided. The method includes identifying an autonomous-driving practicable point at which a planned travel route from the current position of a vehicle outside a predetermined area to a destination of the vehicle enters the predetermined area, by referring to map information including information on the predetermined area used in autonomous driving control of the vehicle; calculating a manual-driving section length from the current position of the vehicle to the autonomous-driving practicable point along the planned travel route; and notifying the calculated manual-driving section length to a driver of the vehicle via a notification device provided in the interior of the vehicle.

According to still another embodiment, a non-transitory recording medium that stores a computer program for distance notification is provided. The computer program includes instructions causing a processor mounted on an vehicle to execute a process including identifying an autonomous-driving practicable point at which a planned travel route from the current position of the vehicle outside a predetermined area to a destination of the vehicle enters the predetermined area, by referring to map information including information on the predetermined area used in autonomous driving control of the vehicle; calculating a manual-driving section length from the current position of the vehicle to the autonomous-driving practicable point along the planned travel route; and notifying the calculated manual-driving section length to a driver of the vehicle via a notification device provided in the interior of the vehicle.

The vehicle controller according to the present invention has an advantageous effect of being able to notify a driver of the distance to a location at which his/her vehicle enters an area where autonomous driving control is applicable.

DESCRIPTION OF EMBODIMENTS

A vehicle controller as well as a method and a computer program for distance notification executed by the vehicle controller will now be described with reference to the attached drawings. The vehicle controller can execute autonomous driving control of a vehicle in an area covered by map information including information used in autonomous driving control of the vehicle (hereafter, a "high-precision map"). The area covered by a high-precision map will be referred to as an autonomous-driving practicable area, below. The vehicle controller refers to a planned travel route from the current position of the vehicle to a destination and a high-precision map to identify a location at which the planned travel route enters an autonomous-driving practicable area, i.e., a start point of a section where autonomous driving control is applicable (hereafter, an "autonomous-driving practicable point"). Then the vehicle controller calculates the distance from the current position of the vehicle to the autonomous-driving practicable point along the planned travel route, and notifies the distance to the driver.

Figure 1:
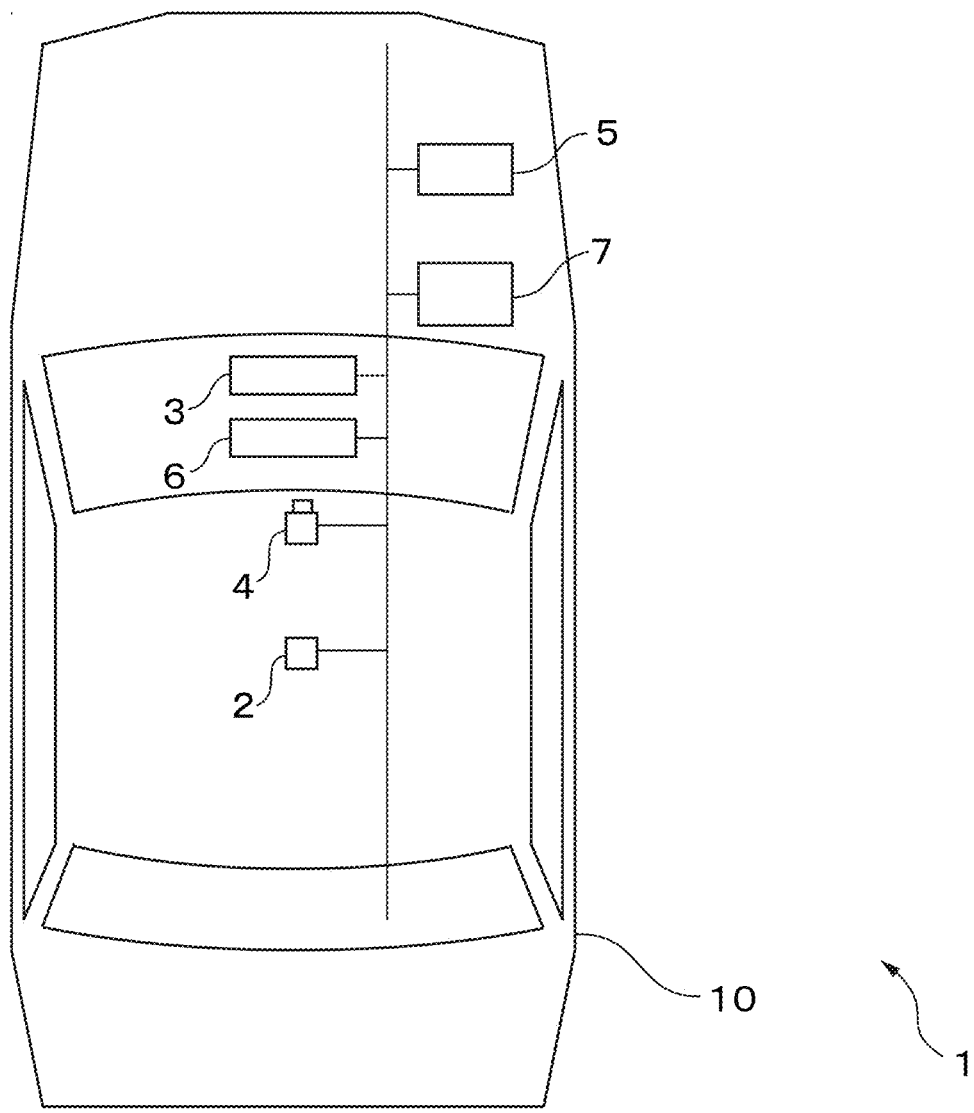
FIG. 1 schematically illustrates the configuration of a vehicle control system equipped with a vehicle controller.
Figure 2:
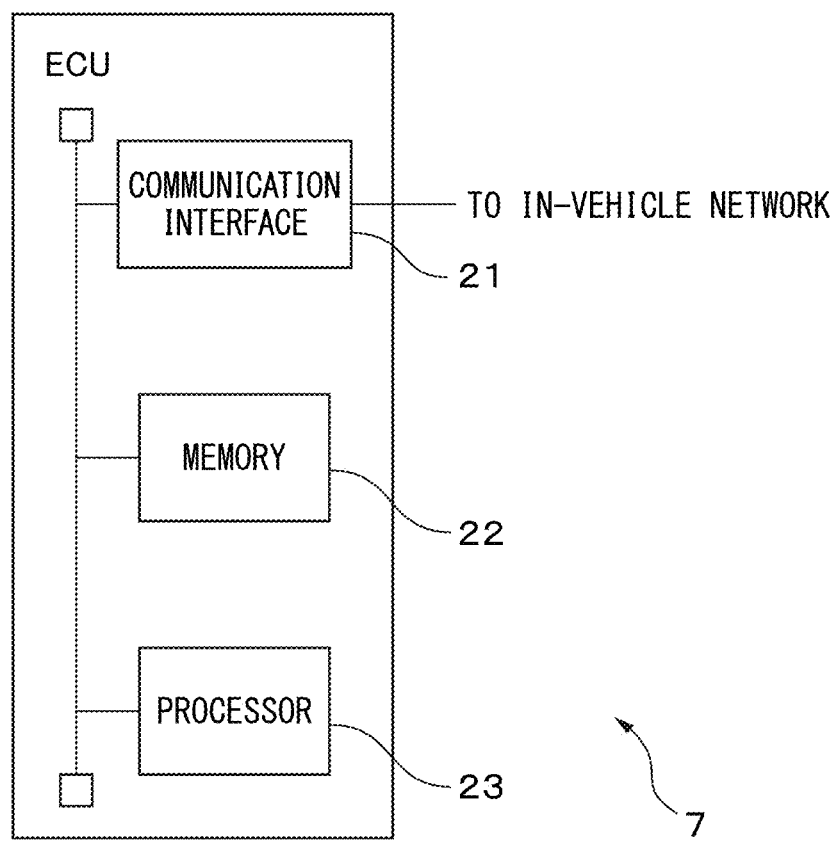
FIG. 2 illustrates the hardware configuration of an electronic control unit, which is an embodiment of the vehicle controller.

FIG. 1 schematically illustrates the configuration of a vehicle control system equipped with the vehicle controller. FIG. 2 illustrates the hardware configuration of an electronic control unit, which is an embodiment of the vehicle controller. In the present embodiment, the vehicle control system 1, which is mounted on a vehicle 10 and controls the vehicle 10, includes a GPS receiver 2, a navigation device 3, a camera 4, a storage device 5, a notification device 6, and an electronic control unit (ECU) 7, which is an example of the vehicle controller. The GPS receiver 2, the navigation device 3, the camera 4, the storage device 5, and the notification device 6 are connected to the ECU 7 via an in-vehicle network conforming to a standard, such as a controller area network, so that they can communicate with each other. The vehicle control system 1 may further include a range sensor (not illustrated), such as LiDAR or radar, which measures the distances from the vehicle 10 to objects around the vehicle 10. The vehicle control system 1 may further include a selector switch (not illustrated) for switching between manual driving mode in which the driver controls travel of the vehicle 10 and autonomous driving mode in which the ECU 7 controls travel of the vehicle 10.

The GPS receiver 2 receives GPS signals from GPS satellites at predetermined intervals, and determines the position of the vehicle 10, based on the received GPS signals. The GPS receiver 2 outputs the result of determination of the position of the vehicle 10 based on the GPS signals to the navigation device 3 and the ECU 7 via the in-vehicle network at predetermined intervals. The vehicle control system 1 may include a receiver conforming to another satellite positioning system, instead of the GPS receiver 2.

The navigation device 3 executes a navigation process on the vehicle 10 in accordance with a navigation program executed on the device. For example, when the driver starts the navigation program and inputs a destination of the vehicle 10, the navigation device 3 starts a search for a planned travel route of the vehicle 10 from the current position of the vehicle 10 to the destination. The navigation device 3 refers to a map for navigation stored therein to determine a planned travel route of the vehicle 10 from the current position of the vehicle 10 at starting the search to the destination in accordance with a predetermined route searching technique, such as Dijkstra's algorithm. The navigation device 3 can use, for example, the position of the vehicle 10 based on the latest result of determination received from the GPS receiver 2 as the current position of the vehicle 10.

Upon determining a planned travel route of the vehicle 10, the navigation device 3 outputs information indicating the planned travel route to the ECU 7 via the in-vehicle network. The navigation device 3 may further display thereon a section on the planned travel route around the current position of the vehicle 10, and output a voice for navigating for the driver along the planned travel route with a speaker provided in the interior of the vehicle. Additionally, whenever the current position of the vehicle 10 falls outside the planned travel route, the navigation device 3 may modify the planned travel route so that it will lead from the current position of the vehicle 10 at this falling to the destination. Whenever modifying the planned travel route, the navigation device 3 outputs information indicating the modified planned travel route to the ECU 7 via the in-vehicle network. Below, any of original and modified planned travel routes will be simply referred to as a planned travel route without any distinction, unless otherwise specified. Information indicating a planned travel route includes, for example, information indicating the lengths of individual road sections on the route, link IDs for identifying the road sections, or the positions of the road sections. The information indicating the positions of the road sections includes, for example, the latitude and longitude of their start points and end points.

The camera 4 includes a two-dimensional detector constructed from an array of optoelectronic transducers, such as CCD or C-MOS, having sensitivity to visible light and a focusing optical system that forms an image of a target region on the two-dimensional detector. The camera 4 is mounted, for example, in the interior of the vehicle 10 so as to be oriented, for example, to the front of the vehicle 10. The camera 4 captures a region in front of the vehicle 10 every predetermined capturing period (e.g., 1/30 to 1/10 seconds), and generates images representing this region. The images obtained by the camera 4 may be color or grayscale images. The vehicle 10 may include multiple cameras taking pictures in different orientations or having different focal lengths. For example, the vehicle 10 may include a camera oriented to the rear thereof.

Whenever generating an image, the camera 4 outputs the generated image to the ECU 7 via the in-vehicle network.

The storage device 5, which is an example of the storage unit, includes, for example, a hard disk drive or a nonvolatile semiconductor memory. The storage device 5 stores a high-precision map including information used in autonomous driving control of the vehicle. The information used in autonomous driving control includes, for example, for each road section included in an autonomous-driving practicable area, information indicating the structure of the road in the road section and information indicating features including road markings such as lane-dividing lines, signposts, and structures around the road section (e.g., traffic lights and roadside noise-blocking walls). The high-precision map may further include information on locations of landmarks, such as interchanges, tollgates, and service plazas of expressways. The high-precision map further includes information indicating the link IDs or the positions of road sections included in the autonomous-driving practicable area and information indicating the outer edge of the autonomous-driving practicable area represented in the map. For example, in the case that the autonomous-driving practicable area is a rectangular area, the high-precision map includes information indicating the latitude and longitude of its northeast and southwest ends. Thus, every location at which an individual road crosses the outer edge of an autonomous-driving practicable area is a location to enter or exit the autonomous-driving practicable area.

The storage device 5 may further include a processor for executing, for example, a process to update the high-precision map and a process related to a request from the ECU 7 to read out the high-precision map. Whenever the vehicle 10 moves a predetermined distance, the storage device 5 may transmit the current position of the vehicle 10 and a request to obtain a high-precision map to a map server via a wireless communication terminal (not illustrated). In this case, the storage device 5 receives a high-precision map of a predetermined area around the current position of the vehicle 10 from the map server via the wireless communication terminal. Upon receiving a request from the ECU 7 to read out a high-precision map, the storage device 5 outputs the high-precision map stored therein or a portion thereof to the ECU 7 via the in-vehicle network.

The notification device 6 is provided in the interior of the vehicle 10, and makes a predetermined notification to the driver by a voice or by display of characters, an icon, or an image. To achieve this, the notification device 6 includes, for example, at least a speaker or a display. The notification device 6 notifies the driver of notification information received from the ECU 7. The notification information includes, for example, information indicating the distance from the current position of the vehicle 10 to an autonomous-driving practicable point. Upon receiving the information indicating the distance from the current position of the vehicle 10 to an autonomous-driving practicable point, the notification device 6 notifies the distance to the driver by a voice from the speaker or by a message, an icon, or an image indicating the distance on the display.

The ECU 7 controls travel of the vehicle 10. In the present embodiment, the ECU 7 executes autonomous driving control of the vehicle 10 when autonomous driving mode is applied. Even when autonomous driving mode is applied, the ECU 7 may execute autonomous driving control of the vehicle 10 only if the driver's behavior satisfies a predetermined condition. The predetermined condition may be, for example, that the driver continues looking ahead of the vehicle 10.

Additionally, when the current position of the vehicle 10 is outside the autonomous-driving practicable area covered by a high-precision map, the ECU 7 refers to the planned travel route and the high-precision map to identify an autonomous-driving practicable point. The ECU 7 then calculate the distance from the current position of the vehicle 10 to the autonomous-driving practicable point along the planned travel route, and notifies the distance to the driver with the notification device 6.

As illustrated in FIG. 2, the ECU 7 includes a communication interface 21, a memory 22, and a processor 23. The communication interface 21, the memory 22, and the processor 23 may be separate circuits or a single integrated circuit.

The communication interface 21 includes an interface circuit for connecting the ECU 7 to the in-vehicle network. Whenever receiving the result of determination of the position of the vehicle from the GPS receiver 2, the communication interface 21 passes the result of determination to the processor 23. Whenever receiving an image from the camera 4, the communication interface 21 passes the received image to the processor 23. When receiving a planned travel route from the navigation device 3, the communication interface 21 passes the planned travel route to the processor 23. Additionally, the communication interface 21 passes a high-precision map read from the storage device 5 to the processor 23. Additionally, the communication interface 21 outputs notification information for the driver received from the processor 23 to the notification device 6 via the in-vehicle network.

The memory 22, which is another example of the storage unit, includes, for example, volatile and nonvolatile semiconductor memories. The memory 22 stores various algorithms and various types of data used in a distance notification process and a vehicle control process executed by the processor 23 of the ECU 7. For example, the memory 22 stores a planned travel route, images of the surroundings of the vehicle 10, the result of determination of the position of the vehicle, a high-precision map, and internal parameters of the camera 4. Additionally, the memory 22 temporarily stores various types of data generated during the distance notification process or the vehicle control process. The memory 22 may further store a map for navigation used for searching for a travel route. The map for navigation, which is an example of the route-search-purpose map information, includes information for identifying road sections included in the area covered by the map (e.g., link IDs) and information indicating the lengths of the road sections and the connection relationship therebetween.

The processor 23 includes one or more central processing units (CPUs) and a peripheral circuit thereof. The processor 23 may further include another operating circuit, such as a logic-arithmetic unit, an arithmetic unit, or a graphics processing unit. The processor 23 executes the distance notification process and the vehicle control process on the vehicle 10.

Figure 3:
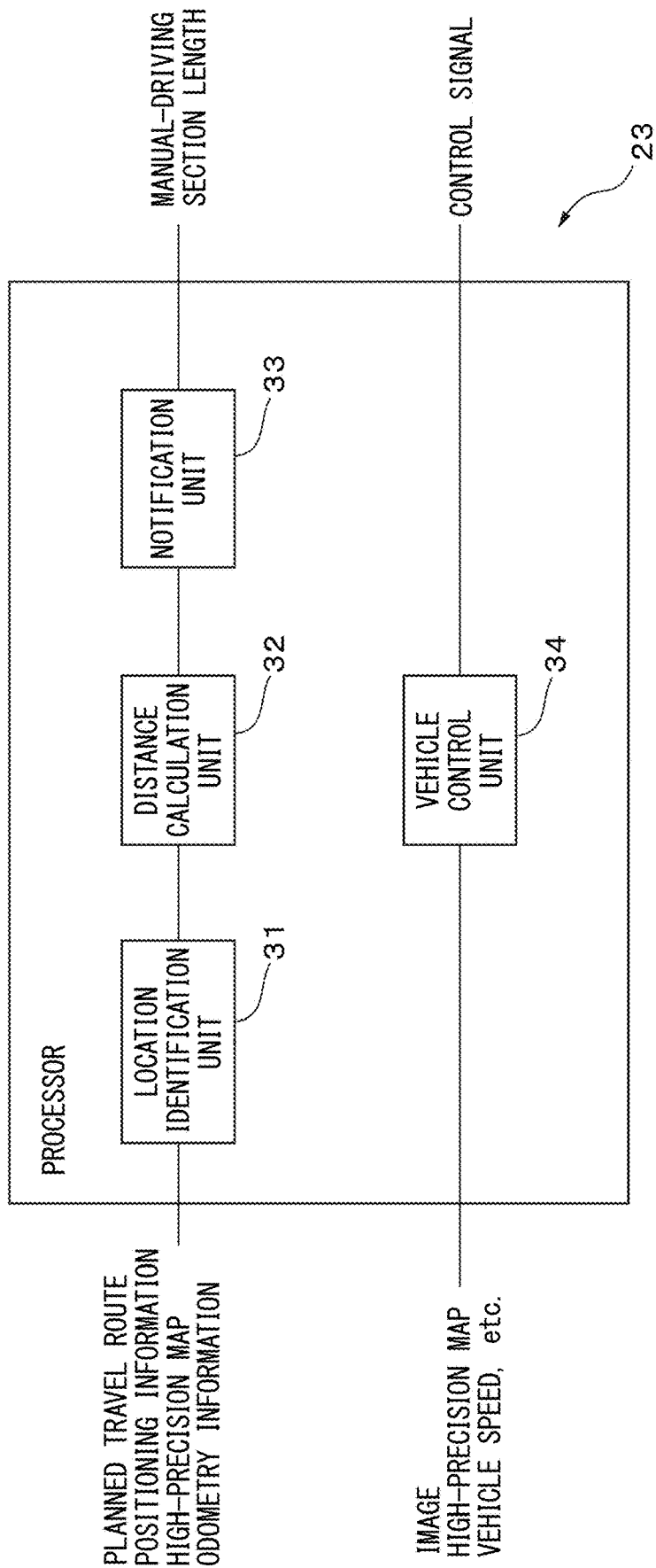
FIG. 3 is a functional block diagram of a processor of the electronic control unit, related to a distance notification process and a vehicle control process.

FIG. 3 is a functional block diagram of the processor 23. The processor 23 includes a location identification unit 31, a distance calculation unit 32, a notification unit 33, and a vehicle control unit 34. These units included in the processor 23 are, for example, functional modules implemented by a computer program executed on the processor 23, or may be dedicated operating circuits provided in the processor 23. Of these units included in the processor 23, the location identification unit 31, the distance calculation unit 32, and the notification unit 33 are related to the distance notification process whereas the vehicle control unit 34 is related to the vehicle control process.

The location identification unit 31 determines whether the current position of the vehicle 10 is included in the autonomous-driving practicable area covered by a high-precision map, when a planned travel route is generated or modified. When the current position of the vehicle 10 is outside the autonomous-driving practicable area, the location identification unit 31 refers to the planned travel route and the high-precision map to determine whether the planned travel route is partially included in the autonomous-driving practicable area. Additionally, when the planned travel route is partially included in the autonomous-driving practicable area, the location identification unit 31 identifies an autonomous-driving practicable point. As the current position of the vehicle 10, the location identification unit 31 may use, for example, the position of the vehicle 10 based on the latest result of determination received from the GPS receiver 2. Alternatively, the location identification unit 31 may calculate the current position of the vehicle 10 by correcting its position, for example, with the wheel speed measured by a wheel speed sensor (not illustrated) provided for the vehicle 10 from the latest time of determination of its position until the current time.

When the current position of the vehicle 10 is outside the area indicated by the information indicating the outer edge of the autonomous-driving practicable area included in a high-precision map, the location identification unit 31 determines that the current position of the vehicle 10 is outside the autonomous-driving practicable area.

When the current position of the vehicle 10 is outside the autonomous-driving practicable area, the location identification unit 31 determines whether each road section on the planned travel route is included in the autonomous-driving practicable area in ascending order of distance from the current position of the vehicle 10. Then the location identification unit 31 identifies the first road section included in the autonomous-driving practicable area. To this end, the location identification unit 31 refers to positional information on each road section and the information indicating the outer edge of the autonomous-driving practicable area to determine whether each road section is included in the autonomous-driving practicable area. Alternatively, in the case that the link ID of a road section on the planned travel route matches that of a road section included in the autonomous-driving practicable area, the location identification unit 31 may determine that this road section is included in the autonomous-driving practicable area. When any of the road sections on the planned travel route is included in the autonomous-driving practicable area, the location identification unit 31 determines that the planned travel route is partially included in the autonomous-driving practicable area. In contrast, when none of the road sections on the planned travel route is included in the autonomous-driving practicable area, the location identification unit 31 determines that the planned travel route does not pass through the autonomous-driving practicable area.

Upon identifying the first road section included in the autonomous-driving practicable area in ascending order of distance from the current position of the vehicle 10 on the planned travel route, the location identification unit 31 identifies the position at which the identified road section crosses the outer edge of the autonomous-driving practicable area as an autonomous-driving practicable point. Alternatively, the location identification unit 31 may identify the boundary position between the identified road section and the road section previous thereto as an autonomous-driving practicable point.

The location identification unit 31 notifies the distance calculation unit 32 of the identified autonomous-driving practicable point and the position or the link ID of the first road section included in the autonomous-driving practicable area in ascending order of distance from the current position of the vehicle 10.

The distance calculation unit 32 calculates the distance from the current position of the vehicle 10 to the autonomous-driving practicable point (hereafter, the "manual-driving section length") along the planned travel route at predetermined intervals while the current position of the vehicle 10 is outside the autonomous-driving practicable area. In the present embodiment, the distance calculation unit 32 calculates the sum of the lengths of the road sections on the planned travel route from the current position of the vehicle 10 to the autonomous-driving practicable point. The distance calculation unit 32 further adds to the sum the distance between the current position of the vehicle 10 and the end point of the road section on the planned travel route including the current position as well as the distance between the end point of the road section on the planned travel route including the autonomous-driving practicable point and the autonomous-driving practicable point to calculate the manual-driving section length.

After calculating the manual-driving section length once, the distance calculation unit 32 may correct the manual-driving section length by the distance traveled by the vehicle 10 to update it. For example, the distance calculation unit 32 subtracts the distance traveled by the vehicle 10 between the positions of the vehicle 10 at the previous and the latest calculations of the manual-driving section length from the previous manual-driving section length to update it. The distance calculation unit 32 can calculate the distance traveled by the vehicle 10 between the previous and the latest calculations of the manual-driving section length, based on, for example, the wheel speed obtained during this period.

Figure 4:
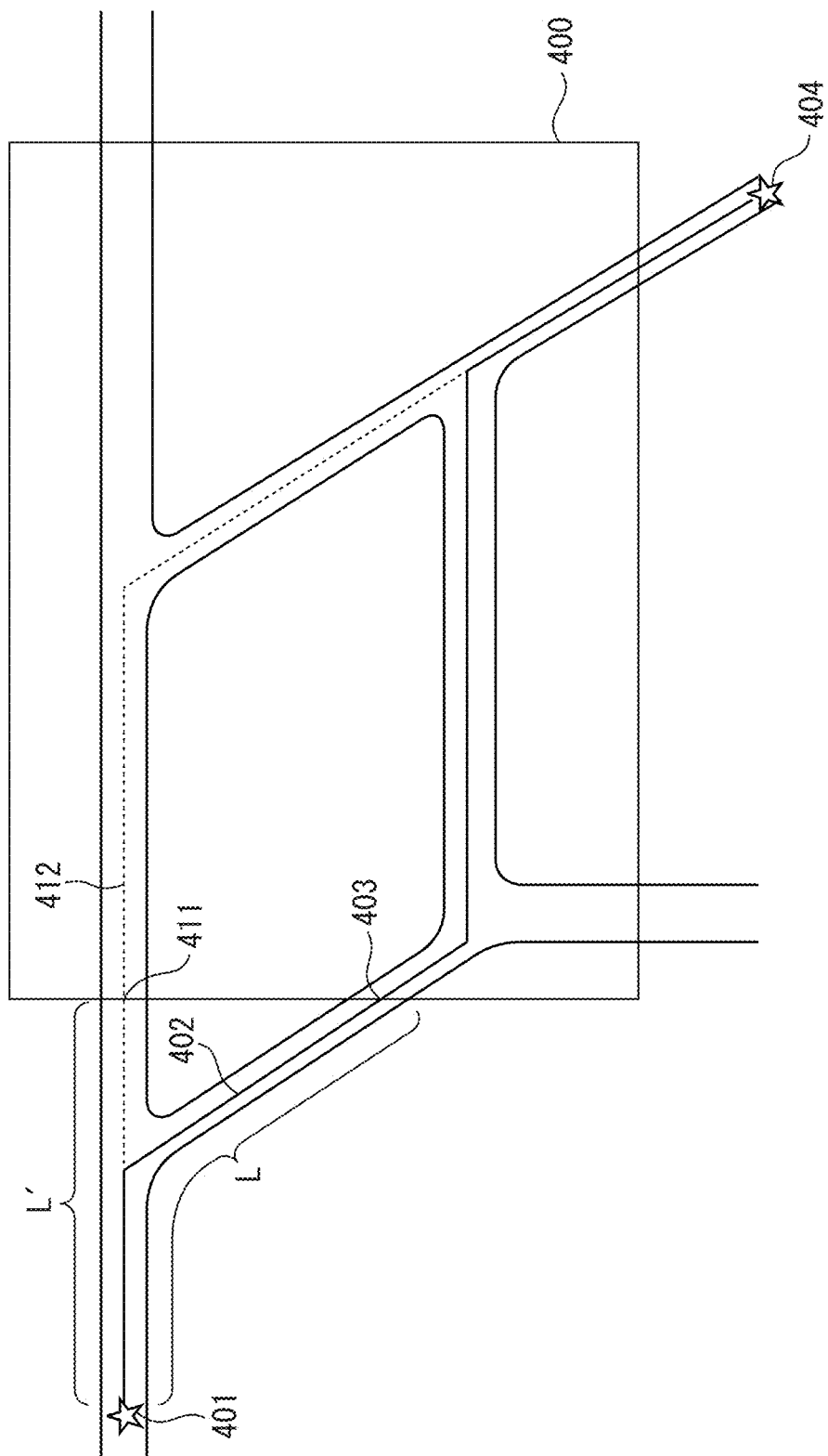
FIG. 4 is a schematic diagram for explaining calculation of the distance from the current position of a vehicle to an autonomous-driving practicable point according to the embodiment.

FIG. 4 is a schematic diagram for explaining calculation of the distance from the current position of the vehicle 10 to an autonomous-driving practicable point according to the embodiment. A location to enter an autonomous-driving practicable area 400 is searched for along a planned travel route 402 of the vehicle 10 leading from the current position 401 of the vehicle 10 outside the autonomous-driving practicable area 400 to a destination 404. In this example, the planned travel route 402 enters the autonomous-driving practicable area 400 at a location 403. Thus the location 403 is identified as an autonomous-driving practicable point. Upon identification of the autonomous-driving practicable point 403, the distance L from the current position 401 to the autonomous-driving practicable point 403 is calculated along the planned travel route 402 as the manual-driving section length.

Whenever calculating the manual-driving section length, the distance calculation unit 32 notifies the calculated manual-driving section length to the notification unit 33.

Whenever being notified by the distance calculation unit 32 of the manual-driving section length, the notification unit 33 notifies the manual-driving section length to the driver via the notification device 6. For example, the notification unit 33 causes an icon or a message indicating the manual-driving section length (e.g., a message such as "XX more kilometers before autonomous driving is practicable") to appear on the display included in the notification device 6. Alternatively, the notification unit 33 causes the speaker included in the notification device 6 to speak the manual-driving section length. The notification unit 33 may notify the driver of the manual-driving section length whenever the manual-driving section length becomes a multiple of a predetermined unit of length (e.g., 1 km or 500 m).

The notification unit 33 may further identify the structure or the landmark closest to the autonomous-driving practicable point by referring to the high-precision map, and notify the driver of the identified structure or landmark and the manual-driving section length via the notification device 6. This enables the driver to easily recognize that the vehicle 10 has reached an autonomous-driving practicable point.

The destination may be outside the autonomous-driving practicable area. In this case, when autonomous driving control is applied during travel of the vehicle 10 in the autonomous-driving practicable area, the notification unit 33 determines whether the vehicle 10 has reached the position on the planned travel route a predetermined distance before the location to exit the autonomous-driving practicable area. When the vehicle 10 reaches the position the predetermined distance before the exit point, the notification unit 33 notifies the driver of the exit point and a message about a switch to manual driving with the notification device 6.

Figure 5:
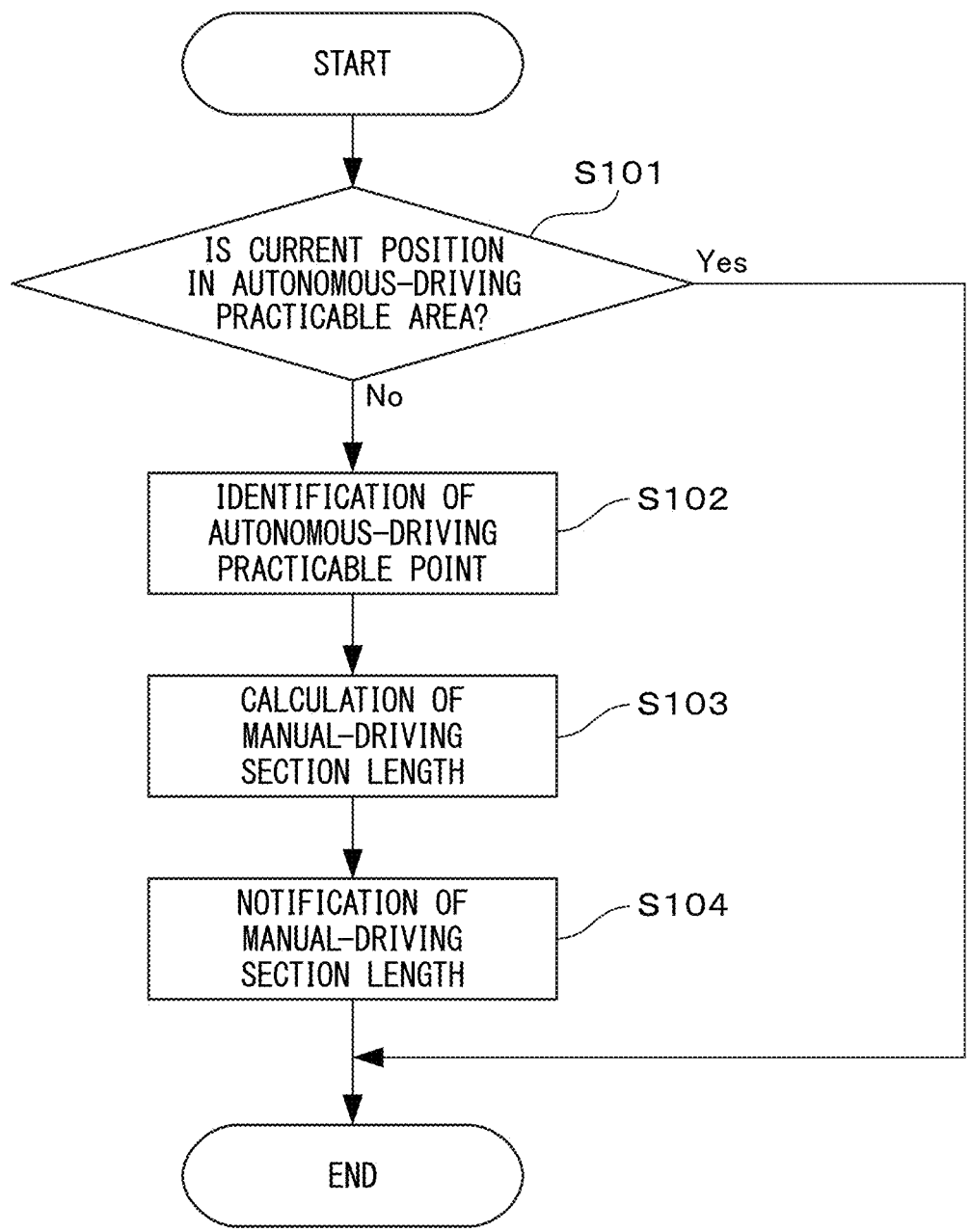
FIG. 5 is an operation flowchart of the distance notification process.

FIG. 5 is an operation flowchart of the distance notification process executed by the processor 23. The processor 23 executes the distance notification process in accordance with this operation flowchart at predetermined intervals.

The location identification unit 31 of the processor 23 determines whether the current position of the vehicle 10 is included in the autonomous-driving practicable area covered by a high-precision map (step S101). When the current position of the vehicle 10 is included in the autonomous-driving practicable area (Yes in step S101), the processor 23 terminates the distance notification process because autonomous driving control is applicable to the vehicle 10.

When the current position of the vehicle 10 is outside the autonomous-driving practicable area (No in step S101), the location identification unit 31 refers to the planned travel route and the high-precision map to identify an autonomous-driving practicable point at which the planned travel route enters the autonomous-driving practicable area (step S102).

Upon identification of the autonomous-driving practicable point, the distance calculation unit 32 of the processor 23 calculates the manual-driving section length from the current position of the vehicle 10 to the autonomous-driving practicable point along the planned travel route (step S103). The notification unit 33 of the processor 23 notifies the manual-driving section length to the driver with the notification device 6 (step S104). Then the processor 23 terminates the distance notification process.

The vehicle control unit 34 executes autonomous driving control of the vehicle 10 in the case that the current position of the vehicle 10 is included in an autonomous-driving practicable area and that the driver has used the selector switch (not illustrated) provided in the interior of the vehicle to apply autonomous driving mode.

For example, the vehicle control unit 34 sets one or more planned trajectories of the vehicle 10 in a predetermined section (e.g., 500 m to 1 km) from the current position of the vehicle 10 to a predetermined distance away. Each planned trajectory is represented, for example, as a set of target positions of the vehicle 10 at respective time points during travel of the vehicle 10 through the predetermined section. The vehicle control unit 34 controls components of the vehicle 10 so that it will travel along the planned trajectory.

The vehicle control unit 34 generates a planned trajectory so as to follow the planned travel route. More specifically, the vehicle control unit 34 refers to the map for navigation or the high-precision map to determine whether the predetermined section includes a location on the planned travel route to turn right or left. In the case that such a location does not exist, the vehicle control unit 34 sets a planned trajectory so that the vehicle 10 will travel along the current travel lane. In the case that the predetermined section includes a location on the planned travel route to turn right or left, the vehicle control unit 34 sets a planned trajectory so that the vehicle 10 can turn right or left at this location. Similarly, the vehicle control unit 34 refers to the map for navigation or the high-precision map to determine whether the predetermined section includes a location on the planned travel route at which the road being traveled by the vehicle 10 diverges into two or more divergent routes. In the case that such a location exits, the vehicle control unit 34 sets a planned trajectory so as to head for a divergent route leading to a destination at this location. Specifically, in the case that the vehicle 10 needs to move to a target lane different from the travel lane to turn right or left or to enter a divergent route leading to a destination, the vehicle control unit 34 sets a planned trajectory so that the vehicle 10 will make a lane change to the target lane. The vehicle control unit 34 identifies the current travel lane and the current position of the vehicle 10 by comparing features represented in an image of the surroundings of the vehicle 10 obtained by the camera 4 with features around the vehicle 10 represented in the high-precision map. Additionally, the vehicle control unit 34 identifies the target lane by referring to the high-precision map.

Additionally, the vehicle control unit 34 sets the planned trajectory so that the vehicle 10 will not collide with surrounding objects (e.g., other vehicles). To achieve this, the vehicle control unit 34 inputs time-series images obtained by the camera 4 in a preceding predetermined period into a classifier to detect one or more objects around the vehicle 10 from each image. Alternatively, the vehicle control unit 34 inputs time-series ranging signals obtained by the range sensor (not illustrated) in a preceding predetermined period into a classifier to detect one or more objects around the vehicle 10 from each ranging signal. As such a classifier, the vehicle control unit 34 may use, for example, a "deep neural network" (hereafter simply a "DNN") having a convolutional neural network (hereafter simply "CNN") architecture. Such a classifier is trained in advance with a large number of images or ranging signals representing detection target objects in accordance with a training technique, such as backpropagation. The vehicle control unit 34 executes a predetermined tracking process on individual objects detected from each image or ranging signal, thereby tracking these objects to determine their trajectories in the preceding predetermined period. The vehicle control unit 34 then applies a predetermined prediction process to the determined trajectories to estimate predicted trajectories along which the respective objects are expected to travel. The vehicle control unit 34 sets the planned trajectory of the vehicle 10, based on the predicted trajectories of the tracked objects, so that a predicted distance between the vehicle 10 and any of the tracked objects will be not less than a predetermined distance until a predetermined time ahead.

Upon setting a planned trajectory, the vehicle control unit 34 controls components of the vehicle 10 so that the vehicle will travel along the planned trajectory. For example, the vehicle control unit 34 determines the acceleration of the vehicle 10 according to the planned trajectory and the current speed of the vehicle 10 measured by a vehicle speed sensor (not illustrated), and sets the degree of accelerator opening or the amount of braking so that the acceleration of the vehicle 10 will be equal to the determined acceleration. Then the vehicle control unit 34 determines the amount of fuel injection according to the set degree of accelerator opening, and outputs a control signal depending on the amount of fuel injection to a fuel injector of an engine of the vehicle 10. Alternatively, the vehicle control unit 34 controls a driving circuit of a motor so that it will be powered depending on the set degree of accelerator opening. Alternatively, the vehicle control unit 34 outputs a control signal depending on the set amount of braking to the brake of the vehicle 10.

When changing the direction of the vehicle 10 in order for the vehicle 10 to travel along the planned trajectory, the vehicle control unit 34 determines the steering angle of the vehicle 10 according to the planned trajectory and outputs a control signal depending on the steering angle to an actuator (not illustrated) that controls the steering wheel of the vehicle 10.

As has been described above, the vehicle controller refers to a planned travel route from the current position of the vehicle to a destination and a high-precision map to identify an autonomous-driving practicable point at which the planned travel route enters the autonomous-driving practicable area covered by the high-precision map. Then the vehicle controller calculates a manual-driving section length from the current position of the vehicle to the autonomous-driving practicable point along the planned travel route, and notifies the calculated manual-driving section length to the driver. The vehicle controller, which refers to the planned travel route and the high-precision map to identify an autonomous-driving practicable point in this way, can accurately determine the autonomous-driving practicable point. For this reason, the vehicle controller can accurately calculate the manual-driving section length, and thus notify the driver of the accurate distance to the autonomous-driving practicable point. This enables the driver to let the ECU to drive the vehicle without delay after passing the autonomous-driving practicable point.

According to a modified example, the location identification unit 31 and the distance calculation unit 32 may search for an entry point into an autonomous-driving practicable area such that the distance from the current position of the vehicle 10 to the autonomous-driving practicable area is shorter than the manual-driving section length (hereafter, an "alternative entry point").

For example, the location identification unit 31 refers to the current position of the vehicle 10 and the high-precision map to detect one or more candidates for an alternative entry point into the autonomous-driving practicable area within the manual-driving section length of the current position. For each of the detected candidates for an alternative entry point, the distance calculation unit 32 refers to the map for navigation to search for a route from the current position of the vehicle 10 to the candidate in accordance with a predetermined route searching technique, such as Dijkstra's algorithm. For each of the detected candidates for an alternative entry point, the distance calculation unit 32 further searches for a route from the candidate to a destination, and calculates the distance from the current position of the vehicle 10 to the candidate along the route. The distance calculation unit 32 then selects one of the candidates whose calculated distance is shorter than the manual-driving section length as an alternative entry point, and the route leading from the current position via the alternative entry point to the destination as an alternative planned travel route. The notification unit 33 notifies the driver of the alternative entry point and the distance from the current position of the vehicle 10 to the alternative entry point as well as a message saying that an alternative entry point has been found, via the notification device 6. In the case that there are multiple candidates for an alternative entry point whose distance from the current position of the vehicle 10 is shorter than the manual-driving section length, the distance calculation unit 32 selects a candidate whose distance from the current position of the vehicle 10 is the shortest of these candidates as an alternative entry point. Alternatively, the distance calculation unit 32 may select a candidate such that the total length of the route leading from the current position of the vehicle 10 via the candidate to the destination is the shortest of these candidates as an alternative entry point. Alternatively, the notification unit 33 may notify the driver of the candidates for an alternative entry point and the distances from the current position of the vehicle 10 to the respective candidates with the notification device 6.

When the driver selects an alternative entry point with a selector switch (not illustrated) provided in the interior of the vehicle, the processor 23 may notify the alternative planned travel route passing the alternative entry point to the navigation device 3 via the communication interface 21. Then the navigation device 3 may navigate the vehicle 10 along the alternative planned travel route notified thereto. Additionally, when the driver causes autonomous driving mode to be applied with the selector switch after the arrival of the vehicle 10 at the alternative entry point, the vehicle control unit 34 executes autonomous driving control of the vehicle along the alternative planned travel route. In the case that the destination is outside the autonomous-driving practicable area, the notification unit 33 determines whether the vehicle 10 has reached the position on the alternative planned travel route a predetermined distance before the location to exit the autonomous-driving practicable area, as in the embodiment. When the vehicle 10 reaches this position, the notification unit 33 notifies the driver of the exit point and a message about a switch to manual driving with the notification device 6.

Referring back to FIG. 4, the distance L' from the current position 401 of the vehicle 10 to an entry point 411 into the autonomous-driving practicable area 400 is shorter than the manual-driving section length L from the current position 401 to the autonomous-driving practicable point 403. Hence the entry point 411 is identified as an alternative entry point, and an alternative planned travel route 412 leading from the current position 401 via the alternative entry point 411 to the destination 404 is identified. Then the driver is notified of the alternative entry point 411 and the distance L' from the current position 401 to the alternative entry point 411 along the alternative planned travel route 412.

According to this modified example, the driver can recognize the existence of an alternative entry point to enter an autonomous-driving practicable area nearer than the autonomous-driving practicable point. For this reason, the driver can drive the vehicle 10 toward the alternative entry point and use autonomous driving control earlier, increasing the driver's convenience.

In some cases, the planned travel route from the current position of the vehicle 10 to a destination does not pass through any autonomous-driving practicable area. In such a case, the location identification unit 31 according to another modified example may refer to the current position of the vehicle 10 and a high-precision map to detect one or more candidates for an entry point to enter the autonomous-driving practicable area within a predetermined distance of the current position of the vehicle 10. For each of the detected candidates for an entry point, the distance calculation unit 32 refers to the map for navigation to search for a route from the current position of the vehicle 10 to the candidate and a route from the candidate to the destination in accordance with a predetermined route searching technique, as in the above-described modified example. For each of the detected candidates for an entry point, the distance calculation unit 32 further calculates the distance from the current position of the vehicle 10 to the candidate along the route. The distance calculation unit 32 then selects a candidate whose distance from the current position of the vehicle 10 is the shortest of the candidates as an entry point, and the route leading from the current position via the entry point to the destination as an alternative planned travel route. The notification unit 33 notifies the driver of the entry point and the distance from the current position of the vehicle 10 to the entry point as well as a message saying that an entry point into an autonomous-driving practicable area has been found, with the notification device 6. Alternatively, the notification unit 33 may notify the driver of the candidates for an entry point and the distances from the current position of the vehicle 10 to the respective candidates with the notification device 6.

According to this modified example, even if autonomous driving control cannot be applied on the original planned travel route, the vehicle controller can present to the driver an alternative planned travel route such that autonomous driving control is applicable at least in some sections. This increases the driver's convenience.

Additionally, when no planned travel route to a destination is set, the location identification unit 31 may detect one or more candidates for an entry point to enter an autonomous-driving practicable area, as in the above-described modified example, at predetermined intervals. In this case, the location identification unit 31 refers to the current position of the vehicle 10 and the high-precision map to detect the candidates for an entry point within a predetermined distance of the current position of the vehicle 10. For a detected candidate for an entry point, the distance calculation unit 32 may further refer to the map for navigation to search for a planned travel route including a route from the current position of the vehicle 10 to the candidate and a route from the candidate to the destination, as in the above-described modified example. The distance calculation unit 32 then selects a candidate whose distance from the current position of the vehicle 10 is the shortest of the candidates as an entry point, and the route leading from the current position via the entry point to the destination as an alternative planned travel route. The notification unit 33 may notify the driver of the entry point and the distance from the current position of the vehicle 10 to the entry point as well as a message saying that an entry point into an autonomous-driving practicable area has been found, with the notification device 6. Alternatively, in the case that multiple candidates for an entry point are found, the distance calculation unit 32 may select these candidates as entry points. Then the notification unit 33 may notify the driver of the entry points and the distances from the current position of the vehicle 10 to the respective entry points with the notification device 6.

According to this modified example, even if no planned travel route is set, the vehicle controller can generate a new planned travel route such that autonomous driving control is applicable at least in some sections, and present it to the driver. This increases the driver's convenience.

A computer program for achieving the functions related to the distance notification process by the processor 23 of the ECU 7 according to the embodiment or modified examples may be provided in a form recorded on a computer-readable and portable medium, such as a semiconductor memory, a magnetic recording medium, or an optical recording medium.

As described above, those skilled in the art may make various modifications according to embodiments within the scope of the present invention.

What is claimed is:

1. A vehicle controller capable of autonomous driving control of a vehicle, the vehicle controller comprising:
   a memory configured to store map information including information on a predetermined area in which autonomous driving control of the vehicle is applicable; and
   a processor configured to:
   refer to the map information to identify an autonomous-driving practicable point at which a planned travel route from the current position of the vehicle outside the predetermined area to a destination of the vehicle enters the predetermined area,
   refer to the map information to detect at least one candidate for an alternative entry point to enter the predetermined area, and
   notify the autonomous-driving practicable point and the at least one candidate to a driver of the vehicle via a notification device provided in the interior of the vehicle.

2. The vehicle controller according to claim 1, wherein the memory further stores route-search-purpose map information for route search, and
   the processor is further configured to:
   calculate a manual-driving section length from the current position of the vehicle to the autonomous-driving practicable point along the planned travel route,
   notify the manual-driving section length to the driver via the notification device provided in the interior of the vehicle,
   for each of the at least one candidate, refer to the route-search-purpose map information to search for a route from the current position of the vehicle to the candidate and to calculate a distance from the current position of the vehicle to the candidate along the route, and
   notify the driver of the at least one candidate or the distance from the current position of the vehicle to the at least one candidate via the notification device.

3. The vehicle controller according to claim 2, the processor is further configured to
   select one of the at least one candidate whose distance from the current position of the vehicle is shorter than the manual-driving section length as an alternative entry point, and notify the driver of the alternative entry point or the distance from the current position of the vehicle to the alternative entry point via the notification device.

4. The vehicle controller according to claim 1, wherein the memory further stores route-search-purpose map information for route search, and the processor is further configured to:
  in the case that the planned travel route is not set, refer to the map information to detect at least one candidate for an entry point to enter the predetermined area within a predetermined distance of the current position of the vehicle,
  for each of the at least one candidate for the entry point, refer to the route-search-purpose map information to search for a route from the current position of the vehicle to the candidate for the entry point and to calculate the distance from the current position of the vehicle to the candidate for the entry point along the route,
  select one of the at least one candidate for the entry point as an entry point, and
  notify the driver of the entry point and the distance from the current position of the vehicle to the entry point via the notification device.

5. A method for distance notification, comprising:
identifying an autonomous-driving practicable point at which a planned travel route from the current position of a vehicle outside a predetermined area to a destination of the vehicle enters the predetermined area, by referring to map information including information on the predetermined area in which autonomous driving control of the vehicle is applicable;

detecting at least one candidate for an alternative entry point to enter the predetermined area by referring to the map information; and notifying the autonomous-driving practicable point and the at least one candidate to a driver of the vehicle via a notification device provided in the interior of the vehicle.

6. A non-transitory recording medium that stores a computer program for distance notification, the computer program causing a processor mounted on a vehicle to execute a process comprising:

identifying an autonomous-driving practicable point at which a planned travel route from the current position of a vehicle outside a predetermined area to a destination of the vehicle enters the predetermined area, by referring to map information including information on the predetermined area in which autonomous driving control of the vehicle is applicable;

detecting at least one candidate for an alternative entry point to enter the predetermined area by referring to the map information; and notifying the autonomous-driving practicable point and the at least one candidate to a driver of the vehicle via a notification device provided in the interior of the vehicle.

* * * * *